US012565207B2

(12) United States Patent　(10) Patent No.:　US 12,565,207 B2
Aoki et al.　(45) Date of Patent:　Mar. 3, 2026

(54) CONTROL DEVICE FOR VEHICLE

(71) Applicant: TOYOTA JIDOSHA KABUSHIKI KAISHA, Toyota (JP)

(72) Inventors: Masakazu Aoki, Nagoya (JP); Satoshi Takamoto, Miyoshi (JP); Yohsuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/382,743

(22) Filed: Oct. 23, 2023

(65) Prior Publication Data

US 2024/0208502 A1　Jun. 27, 2024

(30) Foreign Application Priority Data

Dec. 21, 2022　(JP) ................................. 2022-204745

(51) Int. Cl.
*B60W 30/16*　(2020.01)
*B60W 60/00*　(2020.01)

(52) U.S. Cl.
CPC .......... *B60W 30/16* (2013.01); *B60W 60/005* (2020.02); *B60W 2520/10* (2013.01); *B60W 2520/105* (2013.01); *B60W 2554/4041* (2020.02); *B60W 2554/4042* (2020.02); *B60W 2554/802* (2020.02); *B60W 2554/804* (2020.02); *B60W 2720/106* (2013.01)

(58) Field of Classification Search
None
See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |

(Continued)

FOREIGN PATENT DOCUMENTS

JP　　　　H07-108849　A　　　4/1995

*Primary Examiner* — David P. Merlino

(74) *Attorney, Agent, or Firm* — Dinsmore & Shohl LLP

(57) ABSTRACT

A control device includes a memory device configured to store a first function, and a processor. The first function is specified in advance based on a driving dataset for a plurality of drivers. The processor is configured to: calculate, in accordance with the first function, a vehicle-to-vehicle preference value of a driver according to vehicle-to-vehicle information and subject vehicle speed acquired during follow-up driving in manual driving; calculate, based on the calculated vehicle-to-vehicle preference value, one or more remaining driving preference values for at least one of acceleration, deceleration, deceleration timing, and acceleration timing; and execute, based on the calculated one or more remaining driving preference values, a target value calculation process of calculating one or more control target values for the at least one of the acceleration, the deceleration, the deceleration timing, and the acceleration timing in automated driving with the driver on board.

5 Claims, 3 Drawing Sheets

<Vehicle-to-Vehicle Information>

(56) References Cited

U.S. PATENT DOCUMENTS

| | | | |
|---|---|---|---|
| 2015/0183410 A1* | 7/2015 | Ko | B60T 7/22 |
| | | | 701/96 |
| 2016/0221575 A1* | 8/2016 | Posch | B60W 30/12 |
| 2017/0015318 A1* | 1/2017 | Scofield | H04M 15/60 |
| 2017/0355368 A1* | 12/2017 | O'Dea | B60W 30/14 |
| 2019/0295419 A1 | 9/2019 | Tosa et al. | |
| 2023/0095869 A1* | 3/2023 | Kubatzki | B60W 30/16 |
| | | | 701/96 |
| 2023/0128456 A1* | 4/2023 | Natarajan | B60W 40/04 |
| | | | 701/23 |
| 2023/0174052 A1* | 6/2023 | Tan | B60W 10/20 |
| | | | 701/28 |
| 2023/0398988 A1* | 12/2023 | Barrett | B60W 40/09 |

* cited by examiner

<Vehicle-to-Vehicle Information>

CONTROL DEVICE FOR VEHICLE

CROSS-REFERENCES TO RELATED APPLICATION

The present disclosure claims priority under 35 U.S.C. § 119 to Japanese Patent Application No. 2022-204745, filed on Dec. 21, 2022, which is incorporated herein by reference in its entirety.

TECHNICAL FIELD

The present disclosure relates to a control device for a vehicle configured to switch between manual driving and automated driving.

BACKGROUND

JP H07-108849 A discloses an automated travel control device for a vehicle. During manual driving by a driver, the automated travel control device learns the preference of the driver for the driving method of the vehicle for each driver. Also, the automated travel control device controls the vehicle traveling based on a result of the learning.

SUMMARY

In order to more appropriately reflect the driving preference of the driver in follow-up traveling in automated driving, it is favorable to acquire a plurality of driving preference values for more automated driving parameters (for example, vehicle-to-vehicle time, and acceleration). Also, it is required that the plurality of driving preference values as described above can be easily learned and acquired during the manual driving of the driver who is a target of acquisition of the driving preference.

The present disclosure has been made in view of the problem described above, and an object thereof is to provide a control device for a vehicle that can easily and appropriately acquire one or more driving preference values of a driver for follow-up traveling of a subject vehicle with respect to a preceding vehicle.

A control device for a vehicle according to the present disclosure is configured to control a subject vehicle configured to switch between manual driving and automated driving. The control device includes a memory device configured to store a first function, and a processor. The first function is specified in advance based on a driving dataset for a plurality of drivers and indicates a relation of a vehicle-to-vehicle preference value with respect to vehicle-to-vehicle information and subject vehicle speed. The vehicle-to-vehicle information is a vehicle-to-vehicle time or a vehicle-to-vehicle distance of the subject vehicle with respect to a preceding vehicle. The vehicle-to-vehicle preference value indicates a preference of a driver for the vehicle-to-vehicle information. The processor is configured to calculate, in accordance with the first function, the vehicle-to-vehicle preference value of the driver according to the vehicle-to-vehicle information and the subject vehicle speed that are acquired during follow-up traveling in the manual driving by the driver. The processor is also configured to calculate, based on the calculated vehicle-to-vehicle preference value, one or more remaining driving preference values that indicate preferences of the driver for at least one of acceleration, deceleration, deceleration timing, and acceleration timing of the subject vehicle during the follow-up traveling. The processor is further configured to execute, based on the calculated one or more remaining driving preference values, a target value calculation process of calculating one or more control target values for the at least one of the acceleration, the deceleration, the deceleration timing, and the acceleration timing in the automated driving with the driver on board. In addition, the first function may be specified using machine learning.

According to the present disclosure, it is possible to easily and appropriately acquire one or more driving preference values of the driver for the follow-up traveling of the subject vehicle with respect to the preceding vehicle.

DETAILED DESCRIPTION

Embodiments of the present disclosure will be described with reference to the accompanying drawings.

1. Configuration of Vehicle

Figure 1:
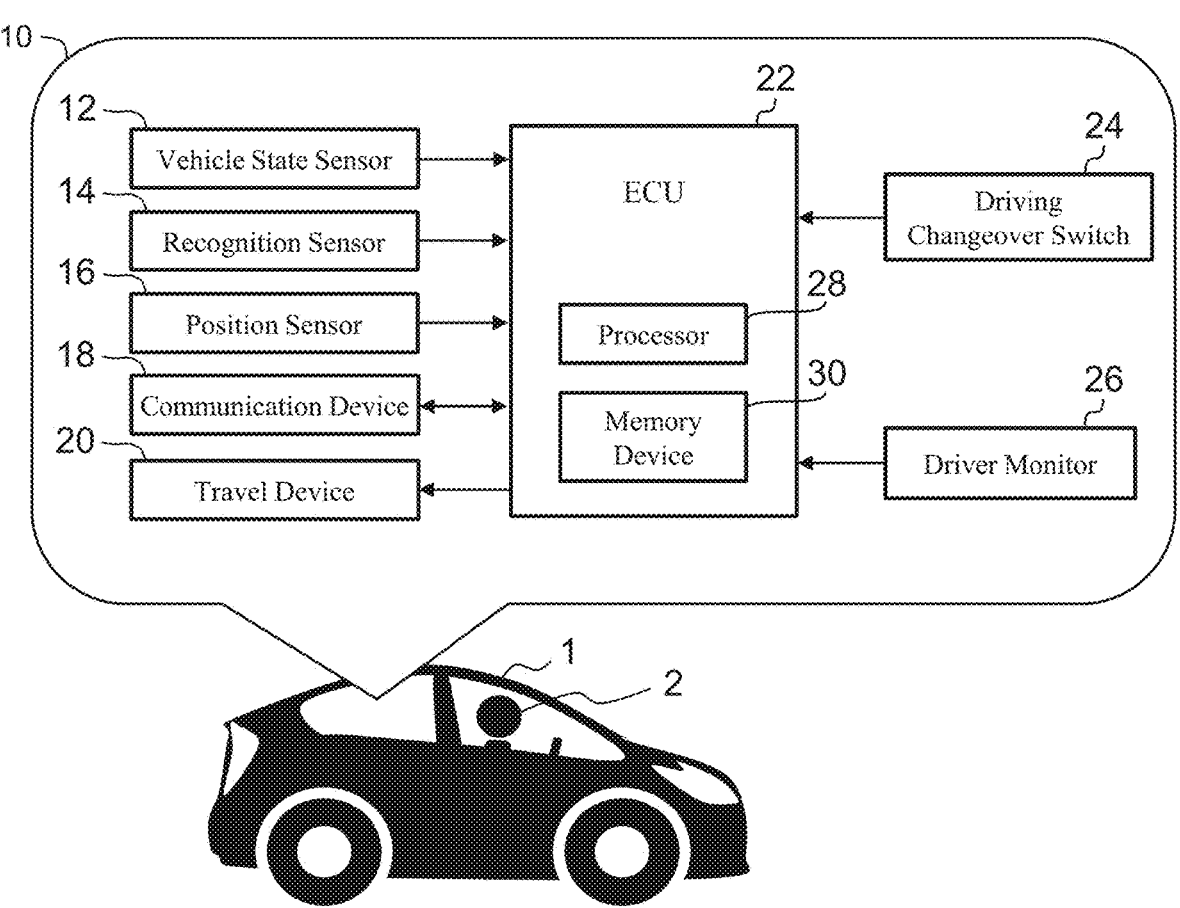
FIG. 1 is a diagram schematically illustrating an example of a configuration of a vehicle according to an embodiment.

FIG. 1 is a diagram schematically illustrating an example of a configuration of a vehicle 1 according to an embodiment. The vehicle 1 includes a vehicle control system 10. The vehicle control system 10 is mounted on the vehicle 1 and is configured to control traveling of the vehicle 1. The vehicle control system 10 includes a vehicle state sensor 12, a recognition sensor 14, a position sensor 16, a communication device 18, a travel device 20, an electronic control unit (ECU) 22, a driving changeover switch 24, and a driver monitor 26.

The vehicle state sensor 12 detects a state of the vehicle 1. The vehicle state sensor 12 includes, for example, a vehicle speed sensor, a longitudinal acceleration sensor, an accelerator pedal sensor, a brake pedal sensor, and a steering angle sensor. The recognition sensor 14 recognizes (detects) a situation around the vehicle 1. The recognition sensor 14 includes, for example, a camera. The position sensor 16 detects a position and a direction of the vehicle 1. The position sensor 16 includes, for example, a global navigation satellite system (GNSS) receiver.

The communication device 18 communicates with the outside of the vehicle 1. The communication device 18 communicates with, for example, an external system and acquires various pieces of information. The information includes, for example, map information and traffic information. The map information includes road information, such as road gradient. The traffic information includes, for example, traffic jam information.

The travel device 20 is a device that operates the vehicle 1. For example, the travel device 20 includes a drive device, a brake device, and a steering device. The drive device includes, for example, at least one of an electric motor and an internal combustion engine for driving (accelerating) the vehicle 1. The brake device includes a brake actuator for braking (decelerating) the vehicle 1. The steering device includes, for example, a steering motor for steering the vehicle 1.

The ECU 22 is a computer configured to control the vehicle 1 and corresponds to an example of the "control device for a vehicle" according to the present disclosure. The ECU 22 includes a processor 28 and a memory device 30. The processor 28 executes various processes. The various processes include processes related to vehicle travel control described below. The memory device 30 stores various types of information necessary for processing by the processor 28. When the processor 28 executes computer programs, various processes by the ECU 22 are realized. The computer programs are stored in the memory device 30. Alternatively, the computer programs may be recorded on a computer-readable recording medium. In addition, the ECU 22 may be configured by combining a plurality of ECUs.

The vehicle control system 10 is configured to perform automated driving control for controlling automated driving of the vehicle 1. This automated driving control has a follow-up traveling function of causing the vehicle 1 to travel so as to follow the preceding vehicle while controlling vehicle-to-vehicle time T or vehicle-to-vehicle distance D of the vehicle (subject vehicle) 1 with respect to the preceding vehicle. More specifically, the automated driving referred to here corresponds to, for example, automated driving at level 3 or higher in the definition of the Society of Automotive Engineers (SAE) in the United States, but is not necessarily limited to the automated driving at level 3 or higher. That is, the automated driving control may be any control as long as it has the follow-up traveling function described above, and may be, for example, an adaptive cruise control (ACC). A known technique is applied to the automated driving control. Therefore, a detailed description of the automated driving control is omitted.

The driving changeover switch 24 is operated by a driver 2, and is used to switch the driving of the vehicle 1 between manual driving by the driver 2 and the automated driving. That is, the vehicle 1 is configured to switch between the manual driving and the automated driving. The manual driving is performed by the driver's own intention to operate an accelerator pedal, a brake pedal, and a steering wheel of the vehicle 1.

The driver monitor 26 includes, for example, a camera installed in the interior of the vehicle 1 to capture an image of the driver 2. By analyzing the image obtained by the camera, it is possible to specify the driver 2 (individual) and detect a state and an action of the driver 2.

2. Vehicle Travel Control

In the present embodiment, the ECU 22 executes a "first preference-value calculation process PR1", a "second preference-value calculation process PR2", and a "target value calculation process PR3", which will be described below, in order to more appropriately reflect the driving preference of the driver 2 in the follow-up traveling during the automated driving.

To be specific, a driving preference value PV that indicates the driving preference of the driver 2 is used in order to evaluate the driving preference of the driver 2. The driving preference value PV indicates, for example, driving characteristics of the driver 2 during the follow-up traveling. More specifically, as an example, the driving preference value PV is specified by a numerical value (for example, a percentile value) according to the driving characteristics during the follow-up traveling (for example, see FIG. 3 described below).

In the present embodiment, a vehicle-to-vehicle preference value PV1, an acceleration preference value PV2, a deceleration preference value PV3, a deceleration-timing preference value PV4, and an acceleration-timing preference value PV5 are used as the driving preference values PV. The driving preference values PV1 to PV5 are calculated by using functions $f1$ to $f9$ described below during the manual driving by the driver 2. Each of the functions $f1$ to $f9$ is specified in advance on the basis of a driving dataset DD (so-called, big data) collected during the follow-up traveling in the manual driving by a plurality of drivers. Each of the calculated driving preference values PV1 to PV5 is reflected in the automated driving control during the follow-up traveling in the automated driving performed while the driver 2 is in the subject vehicle 1.

2-1. First Preference-Value Calculation Process PR1

Figure 2:
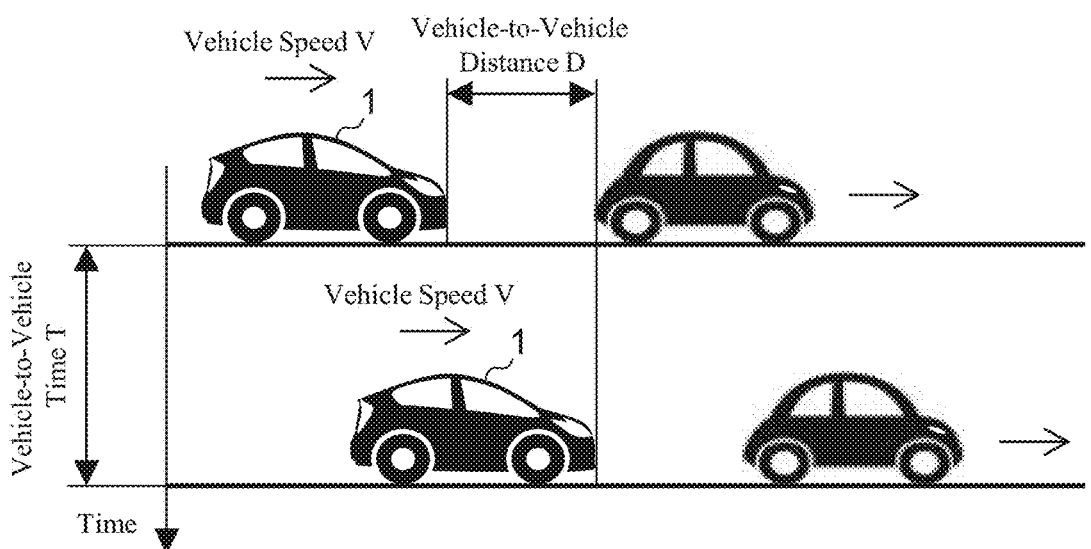
FIG. 2 is a diagram used to describe vehicle-to-vehicle information used in the embodiment.

In the first preference-value calculation process (or simply calculation process) PR1, the ECU 22 calculates a vehicle-to-vehicle preference value PV1 using the function $f1$ (first function). The vehicle-to-vehicle preference value PV1 is a value indicating the preference of the driver 2 for "vehicle-to-vehicle information". FIG. 2 is a diagram used to describe the vehicle-to-vehicle information used in the embodiment. As shown in FIG. 2, the vehicle-to-vehicle information referred to here is a vehicle-to-vehicle time T or a vehicle-to-vehicle distance D of the subject vehicle 1 with respect to a preceding vehicle during the follow-up traveling. The following description will be given by taking the vehicle-to-vehicle time T as an example, but the same applies to the vehicle-to-vehicle distance D.

The function $f1$ represents a relation of the vehicle-to-vehicle preference value PV1 with respect to the vehicle-to-vehicle time T and the subject vehicle speed (i.e., vehicle speed V) as shown in the following Equation (1). The function $f1$ is specified in advance based on data of the vehicle-to-vehicle time T and vehicle speed V included in the driving dataset DD for a plurality of drivers. The function $f1$ is stored in the memory device 30 as, for example, a relational equation as in Equation (1). Alternatively, the function $f1$ may be stored as a map (i.e., table).

$$PV1 = f1(T, V) \tag{1}$$

The vehicle-to-vehicle preference value PV1 indicates the driving characteristics of the driver 2 with respect to the vehicle-to-vehicle time T during the follow-up traveling. More specifically, the vehicle-to-vehicle preference value PV1 is, for example, a percentile value of the vehicle-to-vehicle time T at each vehicle speed V based on the data (big data) of the vehicle-to-vehicle time T and the vehicle speed V collected for a plurality of drivers. That is, the vehicle-to-vehicle preference value PV1 takes a value of 0 to 100. As an example, it is assumed herein that the vehicle-to-vehicle preference value PV1 is a percentile value obtained when the data of the vehicle-to-vehicle time T at each vehicle speed V are arranged in descending order of numerical value. Therefore, the shorter the vehicle-to-vehicle time T is, the greater the percentile value (i.e., the vehicle-to-vehicle preference value PV1) becomes. Consequently, the greater the vehicle-to-vehicle preference value PV1 is, the more aggressive the driver is with respect to the setting (i.e., the selection) of the vehicle-to-vehicle time T. According to the function $f1$, the vehicle-to-vehicle preference value PV1 specified in this way can be calculated from the vehicle-to-vehicle time T and the vehicle speed V.

The calculation process PR1 is executed during the follow-up traveling by the manual driving by the driver 2. In the calculation process PR1, the ECU 22 calculates, in accordance with the function $f1$, the vehicle-to-vehicle preference value PV1 of the driver 2 according to the vehicle-to-vehicle time T and the vehicle speed V that are acquired during the follow-up traveling. According to the calculation process PR1, the vehicle-to-vehicle preference value PV1 is calculated as a learning value of the driving preference of the driver 2 for the vehicle-to-vehicle time T.

2-2. Second Preference-Value Calculation Process PR2

The second preference-value calculation process (or simply calculation process) PR2 corresponds to a process of calculating the remaining driving preference values PV2 to PV5.

(Acceleration Preference Value PV2)

First, the acceleration preference value PV2 indicates the preference of the driver 2 for acceleration Gxa of the subject vehicle 1 during the follow-up traveling. More specifically, the acceleration Gxa corresponds to an acceleration produced when the subject vehicle 1 is accelerated in accordance with the acceleration of the preceding vehicle during the follow-up traveling. In the calculation process PR2, the ECU 22 calculates the acceleration preference value PV2 based on the vehicle-to-vehicle preference value PV1 calculated in the calculation process PR1. The memory device 30 stores, as a relational equation or a map, each of the functions $f2$ and $f3$ related to the acceleration preference value PV2.

As shown in the following Equation (2), the function $f2$ represents a relation of the acceleration preference value PV2 with respect to relative speed $\Delta V$, the acceleration Gxa, and the vehicle-to-vehicle time T. The relative speed $\Delta V$ corresponds to a difference of the subject vehicle speed (vehicle speed V) with respect to the speed of the preceding vehicle. The function $f2$ is specified in advance based on the data of the relative speed $\Delta V$, the acceleration Gxa, and the vehicle-to-vehicle time T included in the driving dataset DD for a plurality of drivers.

$$PV2 = f2(\Delta V, Gxa, T) \qquad (2)$$

The acceleration preference value PV2 indicates the driving characteristics of the driver 2 with respect to the acceleration Gxa during the follow-up traveling. More specifically, the acceleration preference value PV2 is, for example, a percentile value of the acceleration Gxa at each relative speed $\Delta V$ and each vehicle-to-vehicle time T based on the data (big data) of the relative speed $\Delta V$, the acceleration Gxa, and the vehicle-to-vehicle time T collected for a plurality of drivers. That is, the acceleration preference value PV2 takes a value of 0 to 100. As an example, it is assumed herein that the acceleration preference value PV2 is a percentile value obtained when the data of the acceleration Gxa at each relative speed $\Delta V$ and each vehicle-to-vehicle time T are arranged in ascending order of numerical value. Therefore, the higher the acceleration Gxa is, the greater the percentile value (i.e., the acceleration preference value PV2) becomes. Consequently, the greater the value of the acceleration preference value PV2 is, the more aggressive the driver is with respect to the request (i.e., the selection) of the acceleration Gxa. According to the function $f2$, the acceleration preference value PV2 specified in this way can be calculated from the relative speed $\Delta V$, the acceleration Gxa, and the vehicle-to-vehicle time T.

As shown in the following Equation (3), the function $f$ represents a relation of the acceleration preference value PV2 with respect to the vehicle-to-vehicle preference value PV1.

$$PV2 = f3(PV1) \qquad (3)$$

Figure 3:
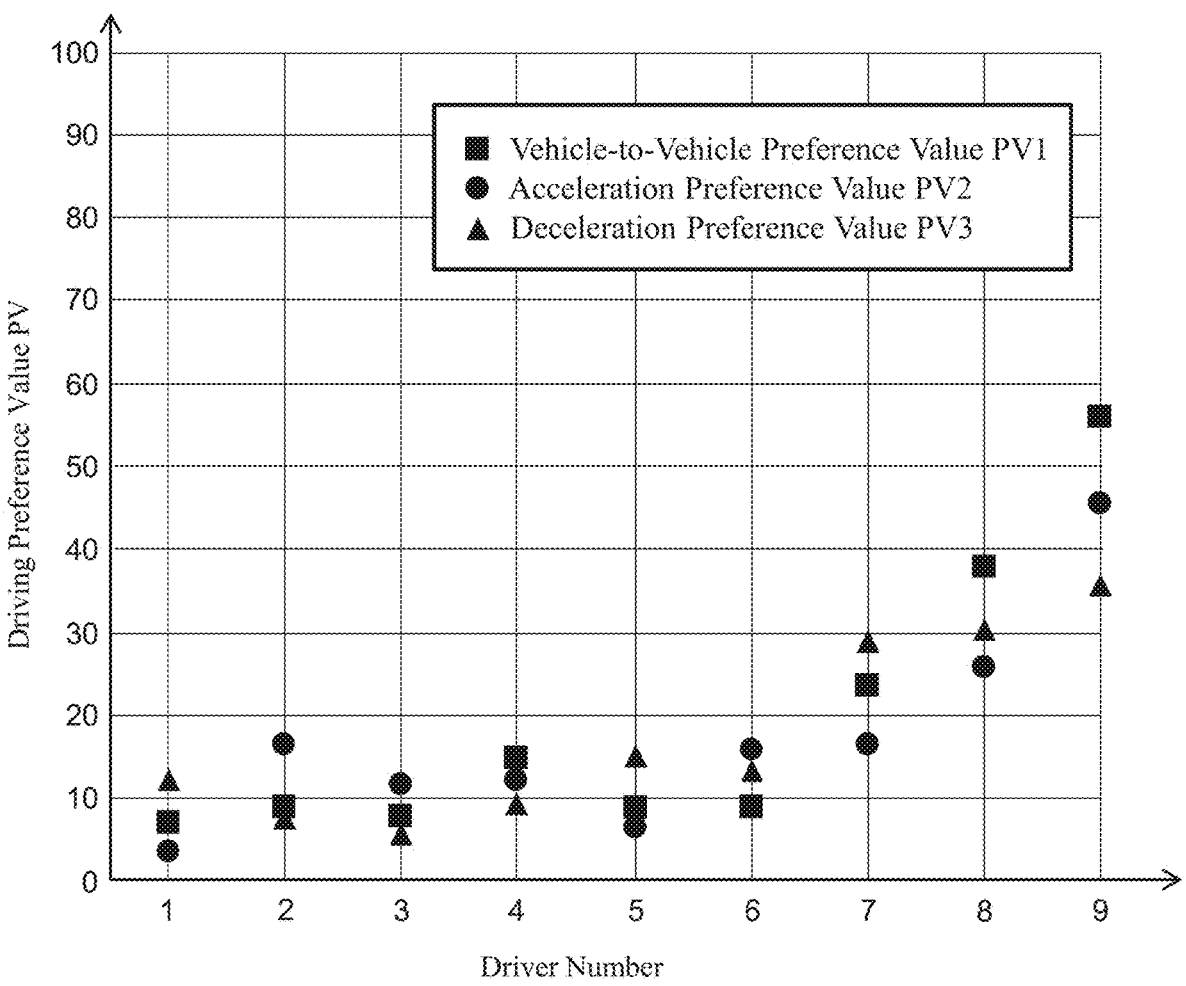
FIG. 3 is a graph showing a relation between driving preference values PV for each driver.

The function $f3$ is specified in advance based on the driving dataset DD for a plurality of drivers and the functions $f1$ and $f2$. FIG. 3 is a graph showing a relation between the driving preference values PV for each driver. In FIG. 3, the relation of the acceleration preference value PV2 and the deceleration preference value PV3 with respect to the vehicle-to-vehicle preference value PV1 is shown for each of nine drivers as an example. Based on the driving dataset DD for the nine drivers, each of the driving preference values PV1 to PV3 in FIG. 3 is calculated for each driver in accordance with the functions $f1$ and $f2$ described above and the function $f4$ described below. It should be noted that the same applies to the other deceleration-timing preference value PV4 and acceleration-timing preference value PV5.

It can be seen from FIG. 3 that, when the driving preference values PV are viewed for each driver, the driving preference values PV2 and PV3 are close to the vehicle-to-vehicle preference value PV1 of the same driver. That is, it can be seen that, according to the analysis results of the driving dataset DD, there is a high correlativity between the vehicle-to-vehicle preference value PV1 and other driving preference values PV2 and PV3. In the present embodiment, based on this finding, an approximate function is specified in advance as the function $f3$ from the relation between the vehicle-to-vehicle preference value PV1 and the acceleration preference value PV2 that are respectively obtained from the functions $f2$ and $f$ using the driving dataset DD for a plurality of drivers.

By using the above-described function $f$, as long as the vehicle-to-vehicle preference value PV1 of the driver 2 is calculated (acquired) once under a vehicle-to-vehicle time T and a vehicle speed V during the follow-up traveling, the acceleration preference value PV2 can be calculated from the vehicle-to-vehicle preference value PV1 and the function $f$. That is, during the follow-up traveling by the driver 2, the acceleration preference value PV2 can be calculated from the vehicle-to-vehicle preference value PV1 without the need to acquire the relative speed $\Delta V$ and the acceleration Gxa (excluding the vehicle-to-vehicle time T acquired as the argument of the function $f1$) that each correspond to the argument of the function $f2$. As described above, according to the function $f3$, if the value of the vehicle-to-vehicle preference value PV1 of a driver is known, the preference of the driver for the acceleration Gxa can be grasped from the vehicle-to-vehicle preference value PV1. The same applies to other driving preference values PV3 to PV5 described below. As described above, according to the present embodiment, each driving preference value PV can be acquired while simplifying the processing for learning the driving preference during the follow-up traveling by the manual driving.

(Deceleration Preference Value PV3)

Next, the deceleration preference value PV3 indicates the preference of the driver 2 for the deceleration Gxb of the subject vehicle 1 during the follow-up traveling. More specifically, the deceleration Gxb corresponds to a deceleration produced when the subject vehicle 1 is decelerated in accordance with the deceleration of the preceding vehicle during the follow-up traveling. In the calculation process PR2, the ECU 22 calculates the deceleration preference value PV3 based on the vehicle-to-vehicle preference value PV1 calculated in the calculation process PR1. The memory device 30 stores, as a relational equation or a map, each of the functions $f4$ and $f5$ related to the deceleration preference value PV3.

As shown in the following Equation (4), the function $f4$ represents a relation of the deceleration preference value PV3 with respect to the relative speed $\Delta V$, the deceleration Gxb, and the vehicle-to-vehicle time T. The function $f4$ is specified in advance based on the data of the relative speed $\Delta V$, the deceleration Gxb, and the vehicle-to-vehicle time T included in the driving dataset DD for a plurality of drivers.

$$PV3 = f4(\Delta V, Gxb, T) \tag{4}$$

The deceleration preference value PV3 indicates the driving characteristics of the driver 2 with respect to the deceleration Gxb during the follow-up traveling. The details of the deceleration preference value PV3 are the same as those of the accelerator preference value PV2 except that the deceleration preference value PV3 is targeted at the deceleration Gxb instead of the acceleration Gxa. Therefore, although a detailed description thereof is omitted, for example, the greater the value of the deceleration preference value PV3 is, the more aggressive the driver is with respect to the request (i.e., the selection) of the deceleration Gxb.

As shown in the following Equation (5), the function $f5$ represents a relation of the deceleration preference value PV3 with respect to the vehicle-to-vehicle preference value PV1. The correlativity between the vehicle-to-vehicle preference value PV1 and the deceleration preference value PV3 is as described with reference to FIG. 3. In the present embodiment, based on this finding, an approximate function is specified in advance as the function $f5$ from the relation between the vehicle-to-vehicle preference value PV1 and the deceleration preference value PV3 that are respectively obtained from the functions $f1$ and $f4$ using the driving dataset DD for a plurality of drivers.

$$PV3 = f5(PV1) \tag{5}$$

(Deceleration-Timing Preference Value PV4)

Next, the deceleration-timing preference value PV4 indicates the preference of the driver 2 for a deceleration timing TMb of the subject vehicle 1 during the follow-up traveling. More specifically, the deceleration timing TMb corresponds to, for example, a time (i.e., response time) from a deceleration start time point of the preceding vehicle to a deceleration start time point of the subject vehicle 1 when the subject vehicle 1 is decelerated in accordance with the deceleration of the preceding vehicle during the follow-up traveling. In the calculation process PR2, the ECU 22 calculates the deceleration-timing preference value PV4 based on the vehicle-to-vehicle preference value PV1 calculated in the calculation process PR1. The memory device 30 stores, as a relational equation or a map, each of the functions $f6$ and 17 related to the deceleration-timing preference value PV4.

As shown in the following Equation (6), the function $f6$ represents a relation of the deceleration-timing preference value PV4 with respect to the relative speed $\Delta V$, the deceleration timing TMb, and the vehicle-to-vehicle time T. The function $f6$ is specified in advance based on the data of the relative speed $\Delta V$, the deceleration timing TMb, and the vehicle-to-vehicle time T included in the driving dataset DD for a plurality of drivers.

$$PV4 = f6(\Delta V, TMb, T) \tag{6}$$

The deceleration-timing preference value PV4 indicates the driving characteristics of the driver 2 with respect to the deceleration timing TMb during the follow-up traveling. The details of the deceleration-timing preference value PV4 are the same as those of the acceleration preference value PV2 except that the deceleration-timing preference value PV4 is targeted at the deceleration timing TMb instead of the acceleration Gxa. Therefore, although a detailed description thereof is omitted, for example, the earlier the deceleration timing TMb is, that is, the shorter the response time is, the more aggressive the driver is with respect to the setting (i.e., the selection) of the deceleration timing TMb.

As shown in the following Equation (7), the function $f7$ represents a relation of the deceleration-timing preference value PV4 with respect to the vehicle-to-vehicle preference value PV1. Similar to the relation shown in FIG. 3, a high correlativity is recognized between the vehicle-to-vehicle preference value PV1 and the deceleration-timing preference value PV4. In the present embodiment, based on this finding, an approximate function is specified in advance as the function $f7$ from the relation between the vehicle-to-vehicle preference value PV1 and the deceleration-timing preference value PV4 that are respectively obtained from the functions $f1$ and $f6$ using the driving dataset DD for a plurality of drivers.

$$PV4 = f7(PV1) \tag{7}$$

(Acceleration-Timing Preference Value PV5)

Next, the acceleration-timing preference value PV5 indicates the preference of the driver 2 for an acceleration timing TMa of the subject vehicle 1 during the follow-up traveling. More specifically, the acceleration timing TMa corresponds to, for example, a time (i.e., response time) from an acceleration start time point of the preceding vehicle to an acceleration start time point of the subject vehicle 1 when the subject vehicle 1 is accelerated in accordance with the acceleration of the preceding vehicle during the follow-up traveling. In the calculation process PR2, the ECU 22 calculates the acceleration-timing preference value PV5 based on the vehicle-to-vehicle preference value PV1 calculated in the calculation process PR1. The memory device 30 stores, as a relational equation or a map, each of the functions $f8$ and $f9$ related to the acceleration-timing preference value PV5.

As shown in the following Equation (8), the function $f8$ indicates a relation of the acceleration-timing preference value PV5 with respect to the relative speed $\Delta V$, the acceleration timing TMa, and the vehicle-to-vehicle time T. The function $f9$ is specified in advance based on the data of the relative speed $\Delta V$, the acceleration timing TMa, and the vehicle-to-vehicle time T included in the driving dataset DD for a plurality of drivers.

$$PV5 = f8(\Delta V, TMa, T) \tag{8}$$

The acceleration-timing preference value PV5 indicates the driving characteristics of the driver 2 with respect to the acceleration timing TMa during the follow-up traveling. The details of the acceleration-timing preference value PV5 are the same as those of the acceleration preference value PV2 except that the acceleration-timing preference value PV5 is targeted at the acceleration timing TMa instead of the acceleration Gxa. Therefore, although a detailed description thereof is omitted, for example, the earlier the acceleration timing TMa is, that is, the shorter the response time is, the more aggressive the driver is with respect to the setting (i.e., the selection) of the acceleration timing TMa.

As shown in the following Equation (9), the function $f9$ indicates a relation of the acceleration-timing preference value PV5 with respect to the vehicle-to-vehicle preference value PV1. Similar to the relation shown in FIG. 3, a high correlativity is recognized between the vehicle-to-vehicle preference value PV1 and the acceleration-timing preference value PV5. In the present embodiment, based on this finding, an approximate function is specified in advance as the function $f9$ from the relation between the vehicle-to-vehicle preference value PV1 and the acceleration-timing preference value PV5 that are respectively obtained from the functions $f1$ and $f8$ using the driving dataset DD for a plurality of drivers.

$$PV5 = f9(PV1) \tag{9}$$

2-3. Target Value Calculation Process PR3

In the target value calculation process (or simply calculation process) PR3, the ECU 22 calculates control target values for the acceleration Gxa, the deceleration Gxb, the deceleration timing TMb, and the acceleration timing TMa. These control target values are used during the follow-up traveling in the automated driving with the driver 2 on board.

To be specific, the ECU 22 calculates a target value Gxat for the acceleration Gxa as the control target value based on the acceleration preference value PV2 calculated in the calculation process PR2. More specifically, in order to calculate the target value Gxat, the acceleration preference value PV2 calculated in accordance with the above-described function $f3$, and the current relative speed $\Delta V$ and vehicle-to-vehicle time T are used. Then, the target value Gxat according to the acceleration preference value PV2, the current relative speed $\Delta V$, and the current vehicle-to-vehicle time T is calculated in accordance with the function $f2$.

Moreover, in the calculation process PR3, respective target values Gxbt, TMbt, and TMat for the deceleration Gxb, the deceleration timing TMb, and the acceleration timing TMa are calculated in the same manner as the target value Gxat. That is, the functions $f4$ and $f5$ are used to calculate the target value Gxbt according to the deceleration preference value PV3. The functions $f6$ and 17 are used to calculate the target value TMbt according to the deceleration-timing preference value PV4. The functions $f8$ and $f9$ are used to calculate the target value TMat according to the acceleration-timing preference value PV5.

2-4. Processing Flow

Figure 4:
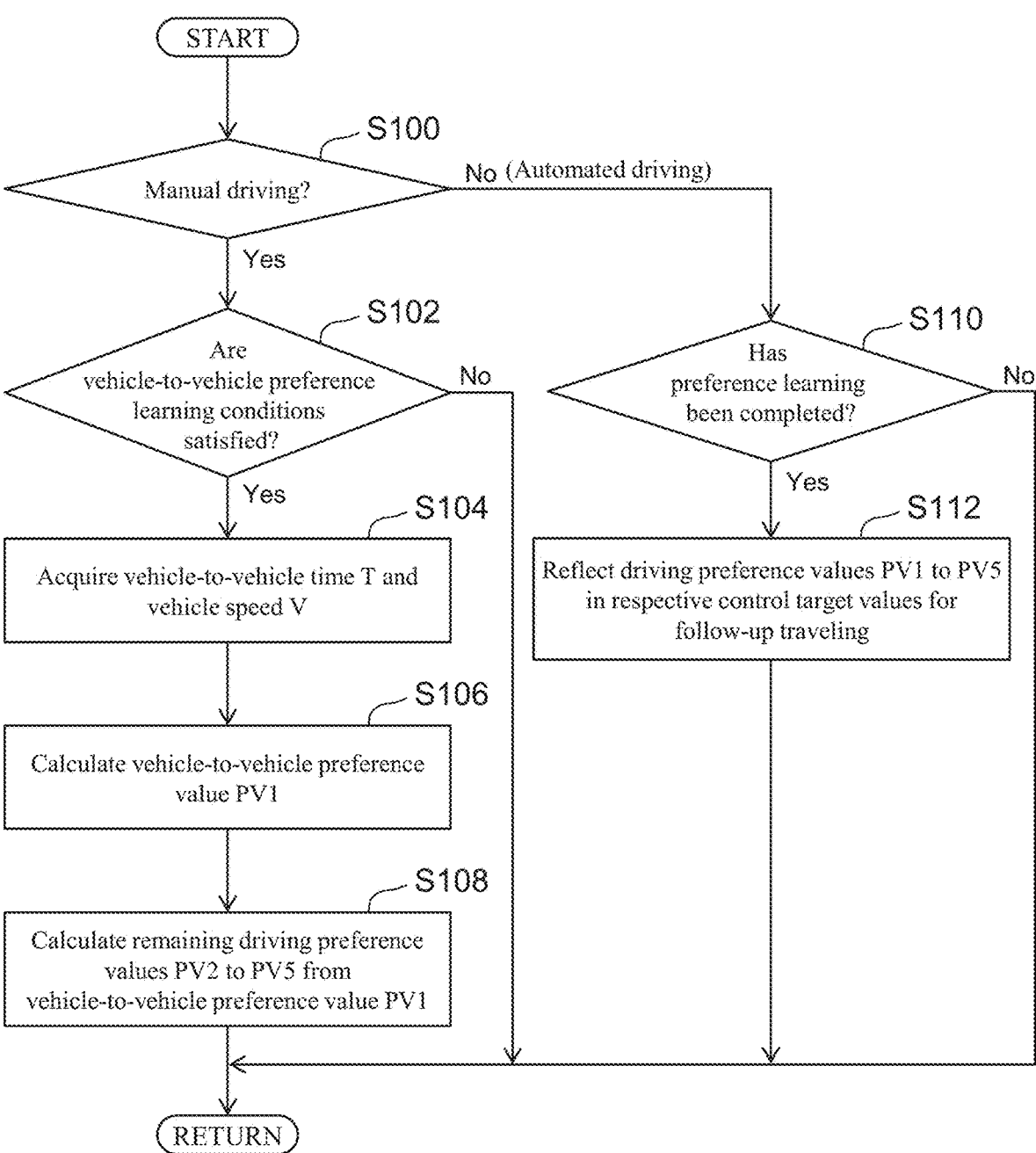
FIG. 4 is a flowchart illustrating an example of processing related to vehicle travel control according to the embodiment.

FIG. 4 is a flowchart illustrating an example of processing related to the vehicle travel control according to the embodiment. The processing of this flowchart is repeatedly executed during activation of the vehicle control system 10. In addition, when the vehicle control system 10 is activated, the ECU 22 uses the driver monitor 26 to execute a process of specifying the driver 2 currently in the vehicle 1. Alternatively, the specification of the driver 2 may be executed, for example, each time the driving is switched between the manual driving and the automated driving during the activation of the vehicle control system 10.

In step S100, the ECU 22 (processor 28) determines whether the vehicle 1 is in the manual driving or in the automated driving. This determination can be made based on, for example, the operation state of the driving changeover switch 24.

When the vehicle 1 is in the manual driving (step S100; Yes), the processing proceeds to step S102. In step S102, the ECU 22 determines whether or not vehicle-to-vehicle preference learning conditions are satisfied. The vehicle-to-vehicle preference learning condition are conditions for executing calculation (learning) of the vehicle-to-vehicle preference value PV1 of the currently specified driver 2. For example, the learning conditions include: that there is a preceding vehicle; that the absolute value of moving average of the relative speed $\Delta V$ for a designated time (for example, 5 seconds) is within a designated threshold value (for example, 2 km/h); that the vehicle speed V of the subject vehicle 1 is higher than a designated threshold value (for example, 1 km/h); that the absolute value of the longitudinal acceleration Gx of the subject vehicle 1 is lower than a designated threshold value (for example, $0.2 \text{ m/s}^2$); and that these four conditions are satisfied for a designated time (for example, 4 seconds) or longer.

When the vehicle-to-vehicle preference learning conditions are not satisfied (step S102; No), the processing proceeds to RETURN. On the other hand, when the vehicle-to-vehicle preference learning conditions are satisfied (step S102; Yes), the processing proceeds to step S104.

In step S104, the ECU 22 acquires the current vehicle-to-vehicle time T and the current vehicle speed V. The vehicle speed V is detected using the vehicle state sensor 12. The vehicle-to-vehicle time T is calculated based on the detected vehicle speed V and the vehicle-to-vehicle distance D acquired using, for example, the recognition sensor 14. Thereafter, the processing proceeds to step S106.

In step S106, the ECU 22 calculates, as the learning value, the vehicle-to-vehicle preference value PV1 of the driver 2 who is currently performing the follow-up traveling. The vehicle-to-vehicle preference value PV1 is calculated from the vehicle-to-vehicle time T and the vehicle speed V acquired in step S104 and the function $f1$. The calculated vehicle-to-vehicle preference value PV1 is stored in the memory device 30. In addition, each of the vehicle-to-vehicle time T and the vehicle speed V used to calculate the vehicle-to-vehicle preference value $f1$ using the function PV1 may be, for example, a mean value or a median value of values acquired a plurality of times in step S104 each time the vehicle-to-vehicle preference learning conditions are satisfied. In FIG. 4, the processing of steps S104 and S106 corresponds to the "first preference-value calculation process PR1".

In step S108 subsequent to the step S106, the ECU 22 uses the functions $f3$, $f5$, 17, and $f9$ to respectively calculate the remaining driving preference values PV2 to PV5 based on the calculated vehicle-to-vehicle preference value PV1. That is, the ECU 22 executes the second preference-value calculation process PR2. The calculated driving preference values PV2 to PV5 are stored in the memory device 30.

On the other hand, when the vehicle 1 is in the automated driving (step S100; No), the ECU 22 executes the automated driving control described above, and the processing proceeds to step S110. In step S110, the ECU 22 determines whether or not the preference learning has been completed. To be specific, in step S110, the ECU 22 determines whether or not the processing proceeds to step S108 during the manual driving and the current driving preference values PV2 to PV5 of the current driver 2 are acquired and stored together with the vehicle-to-vehicle preference value PV1.

When the determination result in step S110 is No, the processing proceeds to RETURN. On the other hand, when the determination result is Yes, the processing proceeds to step S112. In step S112, the ECU 22 causes the driving preference values PV1 to PV5 to be reflected in the respective control target values for the follow-up traveling. To be specific, the ECU 22 calculates a target value Tt for the vehicle-to-vehicle time T from the vehicle-to-vehicle preference value PV1 calculated in step S106, the current vehicle speed V, and the function ƒ1. Further, the ECU 22 executes the target value calculation process PR3 described above to calculate the target values Gxat, Gxbt, TMbt, and TMat for the remaining driving preference values PV2 to PV5, respectively.

3. Effect

As described above, according to the present embodiment, the vehicle-to-vehicle preference value PV1 of the driver 2 is calculated from the vehicle-to-vehicle time T (vehicle-to-vehicle information) and the vehicle speed V during the follow-up traveling in the manual driving by the driver 2. Then, the remaining driving preference values PV2 to PV5 are calculated (derived) from the vehicle-to-vehicle preference value PV1. That is, the driving preference values PV1 to PV5 of the driver 2 can be calculated from the vehicle-to-vehicle time T and the vehicle speed V. As described above, according to the present embodiment, it is possible to easily and appropriately acquire the driving preference values PV1 to PV5 of the driver 2 related to the follow-up traveling. Then, the follow-up traveling reflecting the driving preference values PV1 to PV5 can be performed during the automated driving.

In the embodiment described above, the functions ƒ1 to ƒ9 specified in advance in accordance with a statistical method using the driving dataset DD for a plurality of drivers are used to calculate the driving preference values PV1 to PV5. Instead of this kind of example, the functions ƒ1 to ƒ9 may be specified in advance using machine learning with the driving dataset DD for a plurality of drivers.

Moreover, in step S108 described above, the driving preference values PV2 to PV5 are calculated from the vehicle-to-vehicle preference value PV1 using the functions ƒ3, ƒ5, ƒ7, and ƒ9, respectively. Instead of this kind of example, the same value as the vehicle-to-vehicle preference value PV1 may be calculated (set) as each of the driving preference values PV2 to PV5 based on the finding described with reference to FIG. 3.

Furthermore, one or more remaining driving preference values PV calculated from the vehicle-to-vehicle preference value PV1 may be any one or some but not all of the acceleration preference value PV2, the deceleration preference value PV3, the deceleration-timing-preference value PV4, and the acceleration-timing-preference value PV5.

In the embodiment described above, the memory device 30 and the processor 28, which are examples of the "memory device" and the "processor" according to the present disclosure, are mounted on the vehicle 1. As another example, at least a part of the "memory device" according to the present disclosure may be provided in an external system configured to communicate with the vehicle 1. The external system is, for example, a management server on a cloud. Similarly, at least a part of the processing by the "processor" according to the present disclosure may be executed by a processor included in the external system.

The invention claimed is:

1. A control device for controlling a subject vehicle configured to switch between manual driving and automated driving, the control device comprising:

a memory device configured to store a first function, the first function being specified in advance based on a driving dataset for a plurality of drivers and indicating a relation of a vehicle-to-vehicle preference value with respect to vehicle-to-vehicle information and subject vehicle speed; and a processor, wherein;

the vehicle-to-vehicle information is a vehicle-to-vehicle time or a vehicle-to-vehicle distance of the subject vehicle with respect to a preceding vehicle, the vehicle-to-vehicle preference value indicates a preference of a driver for the vehicle-to-vehicle information, and the processor is configured to:

calculate, in accordance with the first function, the vehicle-to-vehicle preference value of the driver according to the vehicle-to-vehicle information and the subject vehicle speed that are acquired during follow-up traveling in the manual driving by the driver, calculate, based on the calculated vehicle-to-vehicle preference value, one or more remaining driving preference values that indicate preferences of the driver for at least one of acceleration, deceleration, deceleration timing, and acceleration timing of the subject vehicle during the follow-up traveling, and execute, based on the calculated one or more remaining driving preference values, a target value calculation process of calculating one or more control target values for the at least one of the acceleration, the deceleration, the deceleration timing, and the acceleration timing in the automated driving with the driver on board;

determine, in response to the subject vehicle being in the manual driving, whether or not a plurality of vehicle-to-vehicle preference learning conditions are satisfied for a first designated time or longer, the plurality of vehicle-to-vehicle preference learning conditions including:

a presence of the preceding vehicle;

an absolute value of a moving average of a relative speed between a preceding vehicle speed and the subject vehicle speed for a second designated time is within a first designated threshold value;

the subject vehicle speed is higher than a second designated threshold value; and an absolute value of a longitudinal acceleration of the subject vehicle is lower than a third designated threshold value;

acquire a current vehicle-to-vehicle time and a current vehicle speed in response to the plurality of vehicle-to-vehicle preference learning conditions being satisfied; and determine whether the subject vehicle is in the manual driving or in the automated driving based on an operation state of a driving changeover switch.

2. The control device according to claim 1, wherein the memory device is configured to store:

a second function that is specified in advance based on the driving dataset for the plurality of drivers and that indicates a relation of an acceleration preference value with respect to the relative speed between the preceding vehicle speed and the subject vehicle speed, the acceleration, and the vehicle-to-vehicle information; and a third function that is specified in advance based on the driving dataset for the plurality of drivers, the first function, and the second function, and that indicates a relation of the acceleration preference value with respect to the vehicle-to-vehicle preference value, the acceleration preference value is one of the one or more remaining driving preference values, and the processor is configured to:

calculate, in accordance with the third function, the acceleration preference value according to the vehicle-to-vehicle preference value, and in the target value calculation process, calculate, as the control target value, a target value for the acceleration in accordance with the second function, the target value of the acceleration being according to the acceleration preference value calculated in accordance with the third function, the relative speed, and the vehicle-to-vehicle information.

3. The control device according to claim 1, wherein the memory device is configured to store:

a fourth function that is specified in advance based on the driving dataset for the plurality of drivers and that indicates a relation of a deceleration preference value with respect to the relative speed between the preceding vehicle speed and the subject vehicle speed, the deceleration, and the vehicle-to-vehicle information; and a fifth function that is specified in advance based on the driving dataset for the plurality of drivers, the first function, and the fourth function, and that indicates a relation of the deceleration preference value with respect to the vehicle-to-vehicle preference value, the deceleration preference value is one of the one or more remaining driving preference values, and the processor is configured to:

calculate, in accordance with the fifth function, the deceleration preference value according to the vehicle-to-vehicle preference value, and in the target value calculation process, calculate, as the control target value, a target value of the deceleration in accordance with the fourth function, the target value of the deceleration being according to the deceleration preference value calculated in accordance with the fifth function, the relative speed, and the vehicle-to-vehicle information.

4. The control device according to claim 1, wherein the memory device is configured to store:

a sixth function that is specified in advance based on the driving dataset for the plurality of drivers and that indicates a relation of a deceleration-timing preference value with respect to the relative speed between the preceding vehicle speed and the subject vehicle speed, the deceleration timing, and the vehicle-to-vehicle information; and a seventh function that is specified in advance based on the driving dataset for the plurality of drivers, the first function, and the sixth function, and that indicates a relation of the deceleration-timing preference value with respect to the vehicle-to-vehicle preference value, the deceleration-timing preference value is one of the one or more remaining driving preference values, and the processor is configured to:

calculate, in accordance with the seventh function, the deceleration-timing preference value according to the vehicle-to-vehicle preference value, and in the target value calculation process, calculate, as the control target value, a target value of the deceleration timing in accordance with the sixth function, the target value of the deceleration timing being according to the deceleration-timing preference value calculated in accordance with the seventh function, the relative speed, and the vehicle-to-vehicle information.

5. The control device according to claim 1, wherein the memory device is configured to store:

an eighth function that is specified in advance based on the driving dataset for the plurality of drivers and that indicates a relation of an acceleration-timing preference value with respect to the relative speed between the preceding vehicle speed and the subject vehicle speed, the acceleration timing, and the vehicle-to-vehicle information; and a ninth function that is specified in advance based on the driving dataset for the plurality of drivers, the first function, and the eighth function, and that indicates a relation of the acceleration-timing preference value with respect to the vehicle-to-vehicle preference value, the acceleration-timing preference value is one of the one or more remaining driving preference values, and the processor is configured to:

calculate, in accordance with the ninth function, the acceleration-timing preference value according to the vehicle-to-vehicle preference value, and in the target value calculation process, calculate, as the control target value, a target value of the acceleration timing in accordance with the eighth function, the target value of the acceleration timing being according to the acceleration-timing preference value calculated in accordance with the ninth function, the relative speed, and the vehicle-to-vehicle information.

* * * * *